(Model.)
F. W. WOODHULL.
COMBINED CALIPERS, PROTRACTOR, AND BEVEL.
No. 325,036. Patented Aug. 25, 1885.
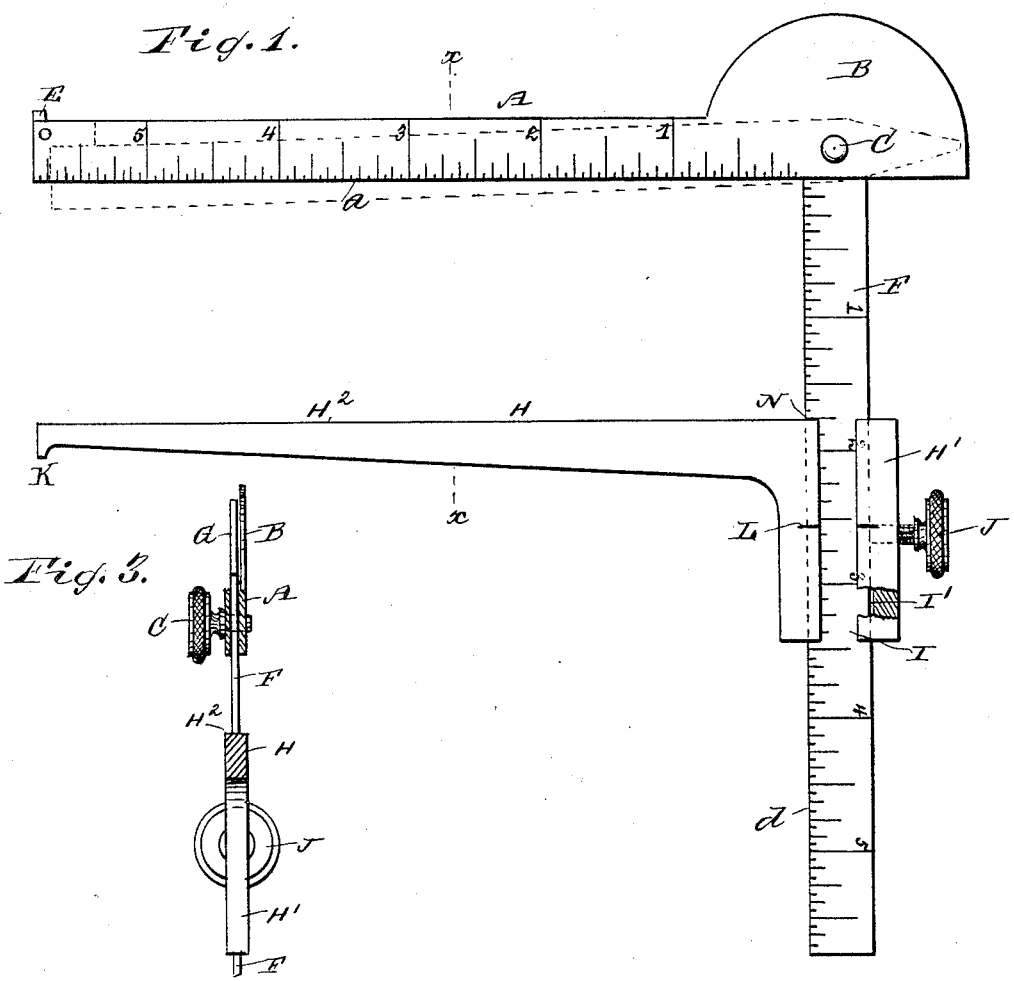
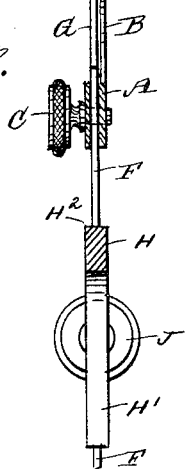
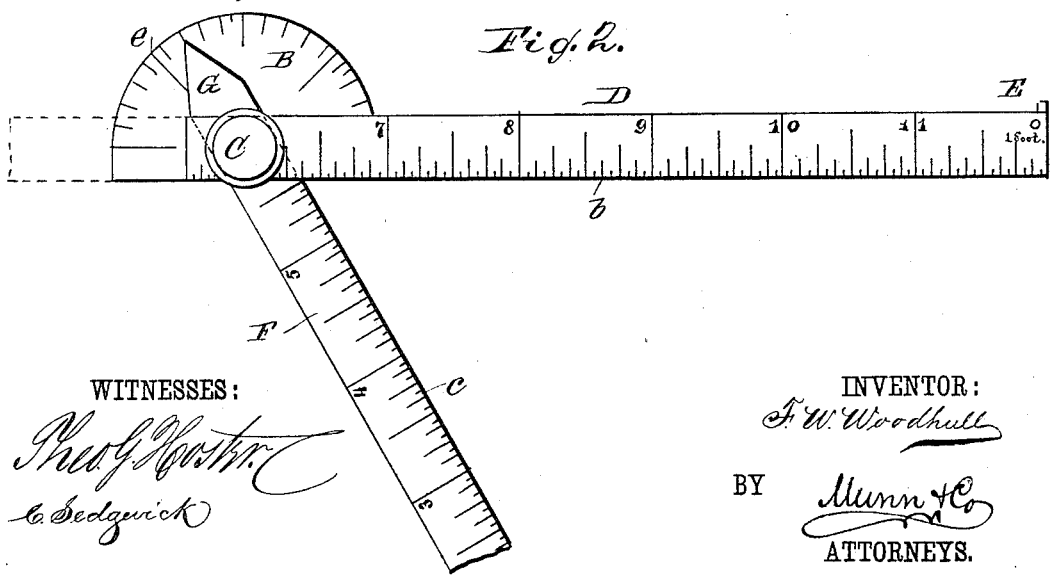
WITNESSES:
Theo. G. Hoster
C. Sedgwick
INVENTOR:
F. W. Woodhull
BY Munn & Co
ATTORNEYS.
N. PETERS, Photo-Lithographer, Washington, D. C.

UNITED STATES PATENT OFFICE.

FREDERICK WIKOFF WOODHULL, OF LINCOLN UNIVERSITY, PA.

COMBINED CALIPER, PROTRACTOR, AND BEVEL.

SPECIFICATION forming part of Letters Patent No. 325,036, dated August 25, 1885.

Application filed May 22, 1885. (Model.)

*To all whom it may concern:*

Be it known that I, FREDERICK WIKOFF WOODHULL, of Lincoln University, in the county of Chester and State of Pennsylvania, have invented a new and Improved Combination-Tool for Measuring, of which the following is a full, clear, and exact description.

The object of my invention is to provide a new and improved combination-tool for measuring, and which is so constructed that it can be used as a rule, a square, a bevel, a protractor, an inside or outside caliper, and as a depth-gage.

The invention consists of three graduated arms pivoted together, of a protractor, and of a caliper-arm.

The invention also consists of various parts and details, hereinafter more fully set forth and described.

Reference is to be had to the accompanying drawings, forming part of this specification, in which similar letters of reference indicate corresponding parts in all the figures.

Figure 1 is a face view of my improved combination-tool, showing the caliper-arm attached. Fig. 2 is a rear face view of my improved combination-tool, showing the same for measuring angles; and Fig. 3 is a vertical cross-section on the lines $x\ x$ of Fig. 1.

The arm A is provided on its face with the graduation $a$, and has the protractor B formed on one end. Through the center of the protractor B passes the thumb-screw C, on which is placed one end of the arm D, the other end of arm D being attached to the pointer E, riveted to the arm A on the opposite end from the protractor B. The arm D is provided on its outer face with the graduation $b$, representing inches and subdivisions. On the thumb-screw C, and between the arms A and D, is placed the arm F, having the graduations $c$ and $d$ on its front and rear faces, respectively, and is provided with the pointer G, which indicates on the graduation $e$, representing degrees and subdivisions on the protractor B.

The caliper-arm H has the right-angular arm H', which is provided with the slot I and the groove I', which can be placed over the arm F and held rigid on the same by means of the thumb-screw J. The caliper-arm H stands with its upper edge, $H^2$, at right angles to the arm F, when placed on the latter, as shown in Fig. 1.

The outer end of the caliper-arm H is provided with the point K, and the angular arm H' is provided on its face with the mark L, to read the measurement of the inside caliper.

The combination-tool can be used when the caliper-arm H is detached as a common rule, by turning the arm F in an opposite direction from the arms A and D, and fastening the three arms together in this position by the thumb-screw C. The graduations $c$ and $b$ indicate a continuous measure from one end to the other, one foot, as shown partly in dotted lines in Fig. 2.

To measure bevels it is necessary to place the arm F and the arms A and D on the bevel to be measured, and the pointer G will indicate the degrees and subdivisions on the protractor B.

A square can be formed by setting the arm F at right angles to the arms A and D and then tightening the thumb-screw C.

In order to use the combination-tool as inside or outside calipers, the arm F is set at right angles to the arms A and D and held in this position by tightening the thumb-screw C. Then the caliper-arm H is placed on the arm F, as shown in Fig. 1, and can be fastened to the arm F by tightening the thumb-screw J. The tool can now be used as an inside or an outside caliper by moving the arm H on the arm F. The outside caliper is taken between the lower edges of the arms A and D and the upper edge, $H^2$, of the arm H, and the measurement is read on the graduation $d$ on arm F at the point N on the upper edge of the arm H. The inside caliper is taken between the point E on the arm A and the point K on the arm H, and the measurement is read on the graduation $d$ on arm F, at the mark L on the right-angular arm H'.

The combination-tool can be used as a depth-gage by placing the caliper-arm in a reversed position on the arm F, so that the edge $H^2$ of arm H is downward and indicating the depth measured on arm F on the graduation C.

When the caliper-arm H is detached from the arm F, the latter can be folded between the arms A and D, as shown in dotted lines in Fig. 1.

The combination-tool can also be used for making parallel lines between the arms A and D and the arm H by adjusting the latter on the arm F.

Having thus described my invention, I claim as new and desire to secure by Letters Patent—

1. The combination, with the arm A, provided with the right-angular point E on its outer end, and the graduated arm F, pivoted thereto, of the caliper-arm H, having the straight upper edge, $H^2$, and provided with the right-angular point K at its outer end, and with the socketed angular arm H', having the mark L, the said caliper-arm being adjustably secured to the graduated arm, substantially as herein shown and described.

2. In a combination-tool for measuring the combination of the graduated arm A, the protractor B, the thumb-screw C, the graduated arm D, the point E, the graduated arm F, the pointer G, the caliper-arm H, the right-angular arm H', having the groove I' and the slot I, the thumb-screw J, the point K, and the mark L, all arranged and operating substantially as shown and described.

FREDERICK WIKOFF WOODHULL.

Witnesses:
L. D. HUTCHISON,
F. C. HUTCHISON.